(12) United States Patent
Tamura et al.

(10) Patent No.: US 7,808,564 B2
(45) Date of Patent: Oct. 5, 2010

(54) STEREOSCOPIC IMAGE DISPLAY APPARATUS AND MANUFACTURING METHOD INCLUDING APPLYING A RESIN, DEGASSING THE RESIN IN A VACUUM FURNACE THEN LAMINATING AN IMAGE DISPLAY SECTION WITH A RETARDER

(75) Inventors: Yoshiyuki Tamura, Niigata (JP); Kazuhiro Ura, Niigata (JP); Kei Fukaishi, Niigata (JP)

(73) Assignee: Arisawa Mfg. Co., Ltd., Niigata (JP)

( * ) Notice: Subject to any disclaimer, the term of this patent is extended or adjusted under 35 U.S.C. 154(b) by 248 days.

(21) Appl. No.: 12/115,553

(22) Filed: May 6, 2008

(65) Prior Publication Data

US 2009/0040401 A1 Feb. 12, 2009

(30) Foreign Application Priority Data

Aug. 9, 2007 (JP) .............................. 2007-208672
Oct. 11, 2007 (JP) .............................. 2007-265907
Feb. 13, 2008 (JP) .............................. 2008-031740

(51) Int. Cl.
G02F 1/1335 (2006.01)

(52) U.S. Cl. .............................. 349/15; 348/51; 348/53

(58) Field of Classification Search ................... 349/15; 348/42–60

See application file for complete search history.

(56) References Cited

U.S. PATENT DOCUMENTS

| | | | |
|---|---|---|---|
| 5,991,074 A | 11/1999 | Nose et al. | |
| 6,055,103 A | 4/2000 | Woodgate et al. | |
| 6,128,059 A | 10/2000 | Nishiguchi | |
| 6,195,205 B1 | 2/2001 | Faris | |
| 6,437,915 B2 * | 8/2002 | Moseley et al. | 359/465 |
| 2003/0107686 A1 | 6/2003 | Sato et al. | |
| 2003/0123147 A1 | 7/2003 | Faris et al. | |

(Continued)

FOREIGN PATENT DOCUMENTS

GB 2326727 A 12/1998

(Continued)

OTHER PUBLICATIONS

"Office Action of Japan counterpart application", issued on Dec. 1, 2009, p. 1-p. 2.

(Continued)

*Primary Examiner*—John Heyman
(74) *Attorney, Agent, or Firm*—Osha Liang LLP

(57) ABSTRACT

There is provided a manufacturing method that includes: applying a resin to a region at which the right eye image generating region and the left eye image generating region of the image display section overlap with the right eye polarization region and the left eye polarization region of the retarder, on at least one of an emission-side surface of the image display section and an incident-side surface of the retarder; after the applying, laminating the image display section and the retarder so that the emission-side surface of the image display section faces the incident-side surface of the retarder; and attaching the image display section and the retarder by hardening the resin between the image display section and the retarder laminated to each other in the laminating.

19 Claims, 15 Drawing Sheets

U.S. PATENT DOCUMENTS

2005/0046941 A1 3/2005 Satoh et al.
2009/0066864 A1* 3/2009 Koyama et al. ............... 349/15

FOREIGN PATENT DOCUMENTS

| | | |
|---|---|---|
| JP | 10-253824 | 9/1998 |
| JP | 2001-290062 | 10/2001 |
| JP | 2002-185983 | 6/2002 |
| JP | 2003-238904 | 8/2003 |
| JP | 2004-091500 | 3/2004 |
| JP | 2004-109258 A | 4/2004 |
| JP | 2005-091595 | 4/2005 |
| JP | 2005-313638 | 11/2005 |
| JP | 2005-321449 | 11/2005 |
| JP | 2006-071766 | 3/2006 |
| JP | 2007-140480 | 6/2007 |
| JP | 2007-171521 | 7/2007 |
| WO | 2007007552 | 1/2007 |

OTHER PUBLICATIONS

"1st Office Action of China counterpart application", issued on Nov. 6, 2009, p. 1-p. 18.

Korean Office Action for Application No. 10-2008-0069715, mailed on Feb. 25, 2010 (6 pages).

Extended European Search Report for Application No. 08157094.7, mailed on Apr. 9, 2010 (5 pages).

* cited by examiner

STEREOSCOPIC IMAGE DISPLAY APPARATUS AND MANUFACTURING METHOD INCLUDING APPLYING A RESIN, DEGASSING THE RESIN IN A VACUUM FURNACE THEN LAMINATING AN IMAGE DISPLAY SECTION WITH A RETARDER

CROSS REFERENCE TO RELATED APPLICATION

The present application claims priority from Japanese Patent Applications No. 2007-208672 filed on Aug. 9, 2007, No. 2007-265907 filed on Oct. 11, 2007, and No. 2008-031740 filed on Feb. 13, 2008, the contents of which are incorporated herein by reference.

BACKGROUND

1. Technical Field

The present invention relates to a stereoscopic image display apparatus and a manufacturing method thereof. The present invention particularly relates to a stereoscopic image display apparatus and a manufacturing method thereof, by which the angle of field is enlarged.

2. Related Art

A stereoscopic image display apparatus combined with a liquid crystal display and a retarder is conventionally known, for example as disclosed in Japanese Patent Application Publication No. H10-253824. In this stereoscopic image display apparatus, the retarder is attached to a polarization plate at the viewer side in the liquid crystal display, using an adhesive or a glue.

SUMMARY

A large-sized liquid crystal display, however, may bend and so on, and so it becomes difficult to maintain the parallelism between the liquid crystal display and the retarder. Moreover, when a plurality of light shields are provided discretely on a surface of the retarder that faces the liquid crystal display and this retarder is attached to the liquid crystal display, the concaves and convexes created by the light shields will impair the flatness of the retarder and the liquid crystal display. When the parallelism and the flatness are impaired with respect to a liquid crystal display and a retarder, moire will be caused, which is a problem.

According to the first aspect related to the innovations herein, one exemplary manufacturing method is a manufacturing method used for a stereoscopic image display apparatus that includes an image display section and a retarder, the image display section including an image generating section that includes a right eye image generating region for generating right eye image light and a left eye image generating region for generating left eye image light, the image display section emitting the right eye image light and the left eye image light as linearly polarized light rays whose polarization axes are parallel to each other, the retarder provided at the emission side of the image display section and including a right eye polarization region, a left eye polarization region, and a light shield that is provided on an incident-side surface of the retarder in a boundary between the right eye polarization region and the left eye polarization region and that shields the incident right eye image light and the incident left eye image light, the retarder, when the right eye image light is incident to the right eye polarization region and the left eye image light is incident to the left eye polarization region, emitting the incident right eye image light and the incident left eye image light as linearly polarized light rays whose polarization axes are orthogonal to each other or circularly polarized light rays that have polarization axes whose rotation directions are reverse to each other, the manufacturing method including: applying a resin to a region where the right eye image generating region and the left eye image generating region of the image display section overlap with the right eye polarization region and the left eye polarization region of the retarder, on at least one of an emission-side surface of the image display section and the incident-side surface of the retarder; after the applying, laminating the image display section and the retarder so that the emission-side surface of the image display section faces the incident-side surface of the retarder; and attaching the image display section and the retarder by hardening the resin between the image display section and the retarder laminated to each other in the laminating.

According to the second aspect related to the innovations herein, one exemplary stereoscopic image display apparatus is a stereoscopic image display apparatus that includes an image display section that includes an image generating section that includes a right eye image generating region for generating right eye image light and a left eye image generating region for generating left eye image light, the image display section emitting the right eye image light and the left eye image light as linearly polarized light rays whose polarization axes are parallel to each other; a retarder provided at the emission side of the image display section and including a right eye polarization region and a left eye polarization region, where the retarder, when the right eye image light is incident to the right eye polarization region and the left eye image light is incident to the left eye polarization region, emits the incident right eye image light and the incident left eye image light as linearly polarized light rays whose polarization axes are orthogonal to each other or circularly polarized light rays that have polarization axes whose rotation directions are reverse to each other; and an adhesive layer provided in a region where the right eye image generating region and the left eye image generating region of the image display section overlap with the right eye polarization region and the left eye polarization region of the retarder, where the adhesive layer attaches an emission-side surface of the image display section to an incident-side surface of the retarder, wherein the retarder includes a light shield that is provided on the incident-side surface in a boundary between the right eye polarization region and the left eye polarization region and that shields the incident right eye image light and the incident left eye image light, and the adhesive layer has a same thickness as the light shield.

According to the third aspect related to the innovations herein, one exemplary manufacturing method is a manufacturing method used for a stereoscopic image display apparatus that includes an image display section and a retarder, the image display section including an image generating section that includes a right eye image generating region for generating right eye image light and a left eye image generating region for generating left eye image light, the image display section emitting the right eye image light and the left eye image light as linearly polarized light rays whose polarization axes are parallel to each other, the retarder provided at the emission side of the image display section and including a right eye polarization region, a left eye polarization region, and a light shield that is provided on an incident-side surface of the retarder in a boundary between the right eye polarization region and the left eye polarization region and that shields the incident right eye image light and the incident left eye image light, the retarder, when the right eye image light is incident to the right eye polarization region and the left eye image light is incident to the left eye polarization region, emitting the incident right eye image light and the incident left eye image light as linearly polarized light rays whose polarization axes are orthogonal to each other or circularly polarized light rays that have polarization axes whose rotation directions are reverse to each other, the manufacturing method including: attaching an adhesive sheet including a hardening resin to a region where the right eye image generating region and the left eye image generating region of the image display section overlap with the right eye polarization region and the left eye polarization region of the retarder, on at least one of an emission-side surface of the image display section and the incident-side surface of the retarder; after the attaching, laminating the image display section and the retarder so that the emission-side surface of the image display section faces the incident-side surface of the retarder; and attaching the image display section and the retarder by hardening the resin between the image display section and the retarder laminated to each other in the laminating.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Figure 1:
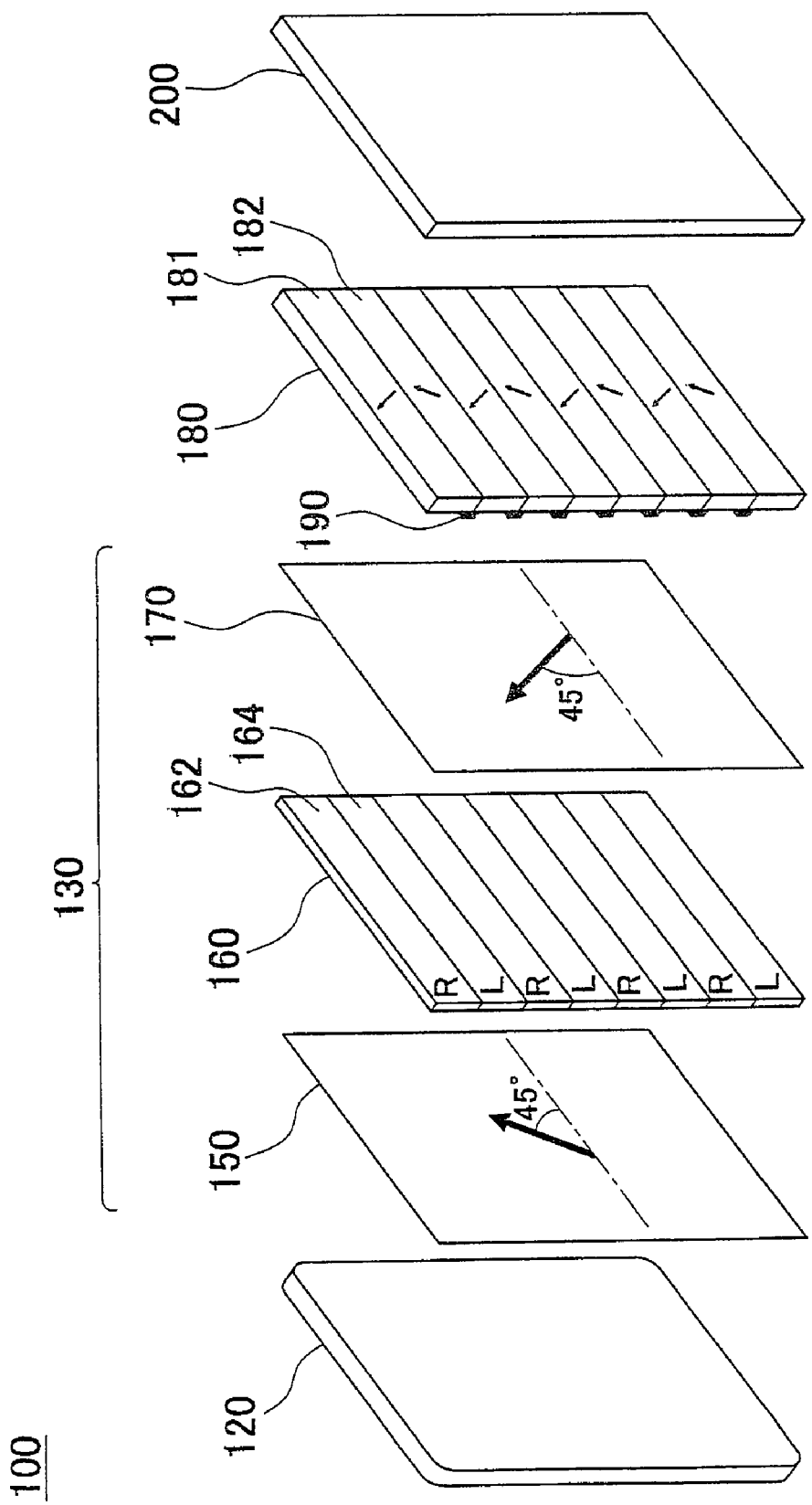
FIG. 1 shows an exploded perspective diagram showing a stereoscopic image display apparatus 100 manufactured according to a manufacturing method of the present embodiment.

FIG. 1 shows an exploded perspective diagram showing a stereoscopic image display apparatus 100 manufactured according to a manufacturing method of the present embodiment. As shown in FIG. 1, the stereoscopic image display apparatus 100 includes a light source 120, an image display section 130, a retarder 180, and an antireflection layer 200, in the stated order. The image display section 130 includes a light-source polarization plate 150, an image generating section 160, and an emission-side polarization plate 170. A viewer 500, detailed later, views a stereoscopic image displayed in this stereoscopic image display apparatus 100, from the right side of the antireflection layer 200 in FIG. 1.

The light source 120 is placed at the backmost of the stereoscopic image display apparatus 100 from the viewer 500. When the stereoscopic image display apparatus 100 is used (hereinafter simply referred to as "in the usage state of the stereoscopic image display apparatus 100"), non-polarized light of white color is emitted to the entire surface of the light-source polarization plate 150. Note that the present embodiment uses a surface light source as the light source 120, however may use a combination of a point light source and a condensing lens. One example of this condensing lens is a Fresnel lens sheet.

The light-source polarization plate 150 is provided between the image generating section 160 and the light source 120. The light-source polarization plate 150 has a transmission axis and an absorption axis that is orthogonal to the transmission axis, and so when non-polarized light emitted from the light source 120 is incident to the light-source polarization plate 150, the light-source polarization plate 150 transmits light having the polarization axis parallel to the transmission axis direction, while cutting off light having the polarization axis parallel to the absorption axis direction. Here, the direction of the polarization axis is a vibration direction of the electric field in the light. The direction of the transmission axis in the light-source polarization plate 150 is 45 degrees in the upper right direction from the horizontal direction when the viewer 500 views the stereoscopic image display apparatus 100, as shown by the arrow in FIG. 1.

The image generating section 160 includes one or more right eye image generating regions 162 and one or more left eye image generating regions 164. These right eye image generating regions 162 and the left eye image generating regions 164 are horizontally divided sections of the image generating section 160, which alternate in the vertical direction as shown in FIG. 1.

In the usage state of the stereoscopic image display apparatus 100, a right eye image is generated in the right eye image generating regions 162 and a left eye image is generated in the left eye image generating regions 164, within the image generating section 160. When the light transmitted through the light-source polarization plate 150 is incident to the right eye image generating regions 162 of the image generating section 160, the light transmitted thorough the right eye image generating regions 162 becomes image light for a right eye image (hereinafter simply referred to as "right eye image light"). Likewise, when the light transmitted through the light-source polarization plate 150 is incident to the left eye image generating regions 164 of the image generating section 160, the light transmitted through the left eye image generating regions 164 becomes image light for a left eye image (hereinafter simply referred to as "left eye image light").

Note that the right eye image light transmitted through the right eye image generating regions 162 and the left eye image light transmitted through the left eye image generating regions 164 become linearly polarized light rays having respective polarization axes in particular directions. Here, the polarization axes in particular directions may be the same direction as each other. In one example shown in FIG. 1, both of the polarization axes are set to the same direction as the direction of the transmission axes of the emission-side polarization plate 170 detailed later. For example, such an image generating section 160 is an LCD (liquid crystal display), where a plurality of small cells are arranged two dimensionally in both horizontal and vertical directions, and liquid crystal is sealed in between alignment films in each cell. In this LCD, each cell is electrically driven to be switched between a state in which light is transmitted without any change to the direction of its polarization axis and a state in which light is transmitted by rotating the direction of its polarization axis by 90 degrees.

The emission-side polarization plate 170 is provided between the viewer 500 and the image generating section 160. When the right eye image light having been transmitted through the right eye image generating regions 162 and the left eye image light having been transmitted through the left eye image generating regions 164 are incident to this emission-side polarization plate 170, the emission-side polarization plate 170 transmits only light whose polarization axis is parallel to the transmission axis and cuts off light whose polarization axis is parallel to the absorption axis. Here, the direction of the transmission axis in the emission-side polarization plate 170 is 45 degrees in the upper left direction from the horizontal direction when the viewer 500 views the stereoscopic image display apparatus 100, as shown by the arrow in FIG. 1.

The retarder 180 includes one or more right eye polarization regions 181 and one or more left eye polarization regions 182. In the retarder 180, the position and the size of the right eye polarization regions 181 and the left eye polarization regions 182 correspond to the position and the size of the right eye image generating regions 162 and the left eye image generating regions 164 of the image generating section 160 as shown in FIG. 1. Accordingly, in the usage state of the stereoscopic image display apparatus 100, right eye image light having been transmitted through the right eye image generating regions 162 is incident to the right eye polarization regions 181, while left eye image light having been transmitted through the left eye image generating regions 164 is incident to the left eye polarization regions 182. On a surface of the retarder 180 that faces the image display section 130, one or more light shields 190 are provided so that each light shield exists in a boundary between a right eye polarization region 181 and a left eye polarization region 182. A light shield 190 absorbs and cuts off image light attempting to be incident to a right eye polarization region 181 of the retarder 180, from left eye image light that should be incident to a left eye polarization region 182 adjacent to the right eye polarization region 181 of the retarder 180. In addition, a light shield 190 absorbs and cuts off image light attempting to be incident to a left eye polarization region 182 of the retarder 180, from right eye image light that should be incident to a right eye polarization region 181 adjacent to the left eye polarization region 182 of the retarder 180. In this way, by providing the light shields 190 in the boundary regions on the retarder 180, the right eye image light and the left eye image light emitted from the stereoscopic image display apparatus 100 are prevented from causing crosstalk.

The right eye polarization regions 181 transmit the incident right eye image light as it is without rotating its polarization axis. The left eye polarization regions 182 rotate the polarization axis of the incident left eye image light into a direction orthogonal to the polarization axis of the right eye image light incident to the right eye polarization regions 181. Accordingly, the polarization axis of the right eye image light having been transmitted through the right eye polarization regions 181 is in a direction orthogonal to the polarization axis of the left eye image light having been transmitted through the left eye polarization regions 182, as shown by the arrow in FIG. 1. Each arrow in the retarder 180 in FIG. 1 represents a polarization axis of polarized light having been transmitted thorough the retarder 180. Transparent glass, a resin, or the like is used as the right eye polarization regions 181 for example, and a half wave retarder having an optical axis at the angle of 45 degrees with respect to the direction of the polarization axis of the incident left eye image light is used as the left eye polarization regions 182 for example. In the example of FIG. 1, the direction of the optical axis of the left eye polarization regions 182 is either a horizontal direction or a vertical direction. Here, the optical axis is one of a fast axis and a slow axis when light passes through the left eye polarization regions 182. Instead of using the retarder 180, it is also possible to use half wave retarders as the right eye polarization regions 181 and the left eye polarization regions 182 respectively, to emit the right eye image light and the left eye image light as linearly polarized light rays respectively having polarization axis orthogonal to each other.

Figure 2:
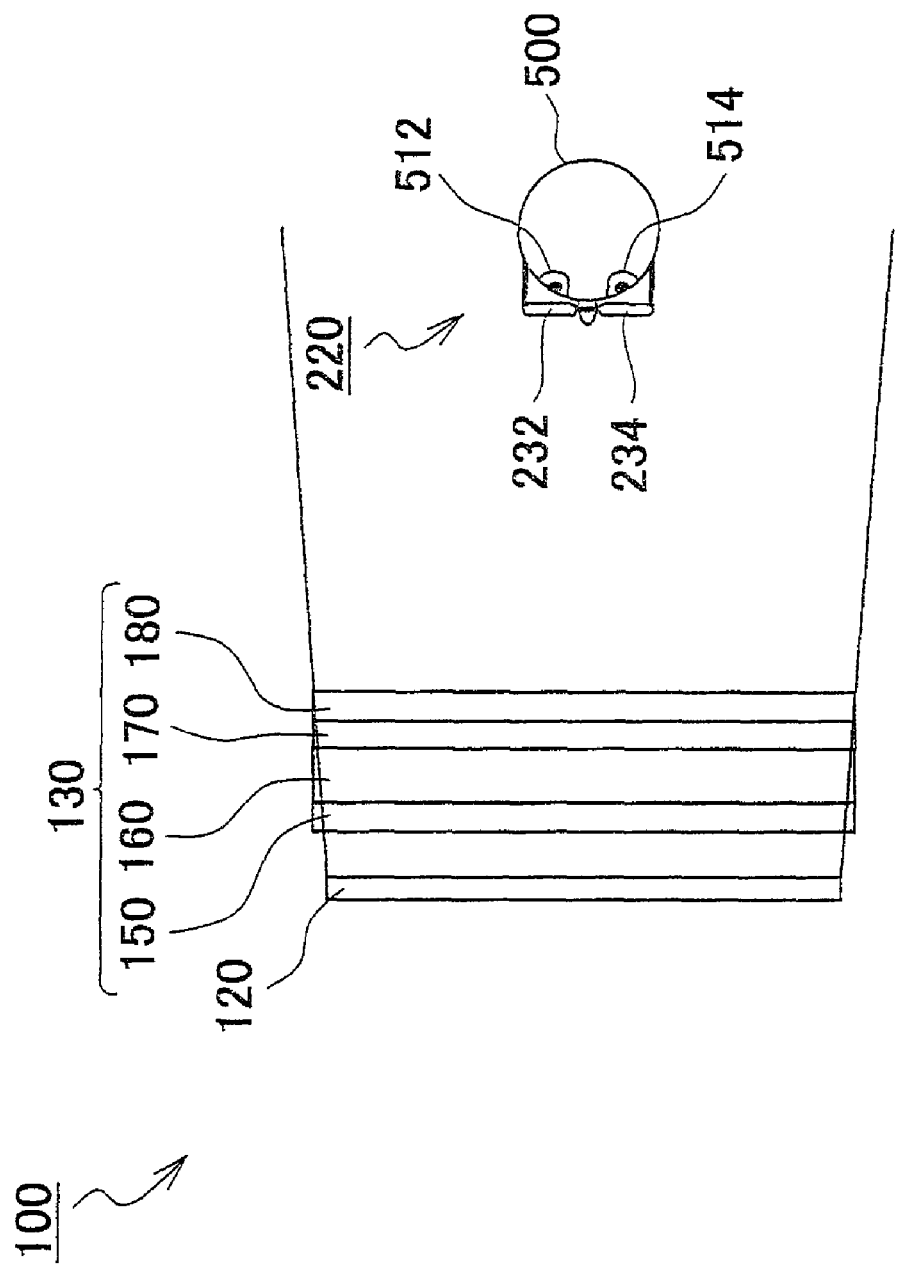
FIG. 2 is a schematic diagram showing a usage state of the stereoscopic image display apparatus 100.

FIG. 2 is a schematic diagram showing a usage state of the stereoscopic image display apparatus 100. When a stereoscopic image is viewed using the stereoscopic image display apparatus 100, the viewer 500 views right eye image light and left eye image light projected from the stereoscopic image display apparatus 100 by wearing polarized glasses 220 as shown in FIG. 2. The polarized glasses 220 are provided with a right eye image transmission section 232 in a position corresponding to the right eye 512 of the viewer 500 when the viewer 500 wears the polarized glasses 220, and a left eye image transmission section 234 in a position corresponding to the left eye 514. The right eye image transmission section 232 and the left eye image transmission section 234 are polarized lenses whose transmission axis is in a different direction from each other, and are fixed to the frame of the polarized glasses 220.

The right eye image transmission section 232 is a polarization plate whose transmission axis direction is in the same as the direction of the right eye image light transmitted through the right eye polarization regions 181, and whose absorption axis direction is orthogonal to the transmission axis direction. The left eye image transmission section 234 is a polarization plate whose transmission axis direction is the same as the left eye image light transmitted through the left eye polarization regions 182, and whose absorption axis direction is orthogonal to the transmission axis direction. For example, each of the right eye image transmission section 232 and the left eye image transmission section 234 is a polarized lens to which a polarized film obtained by subjecting, to uniaxial drawing, the film impregnated with dichroic dye is attached.

In viewing a stereoscopic image using the stereoscopic image display apparatus 100, the viewer 500 views the stereoscopic image display apparatus 100 by wearing the polarized glasses 220 as described above, in the emission range of right eye image light and left eye image light having been transmitted through the right eye polarization regions 181 and the left eye polarization regions 182 of the retarder 180. Accordingly, the right eye 512 is able to view only the right eye image light, and the left eye 514 is able to view only the left eye image light. As a result, the viewer 500 is able to recognize the right eye image light and the left eye image light as a stereoscopic image.

Figure 3:
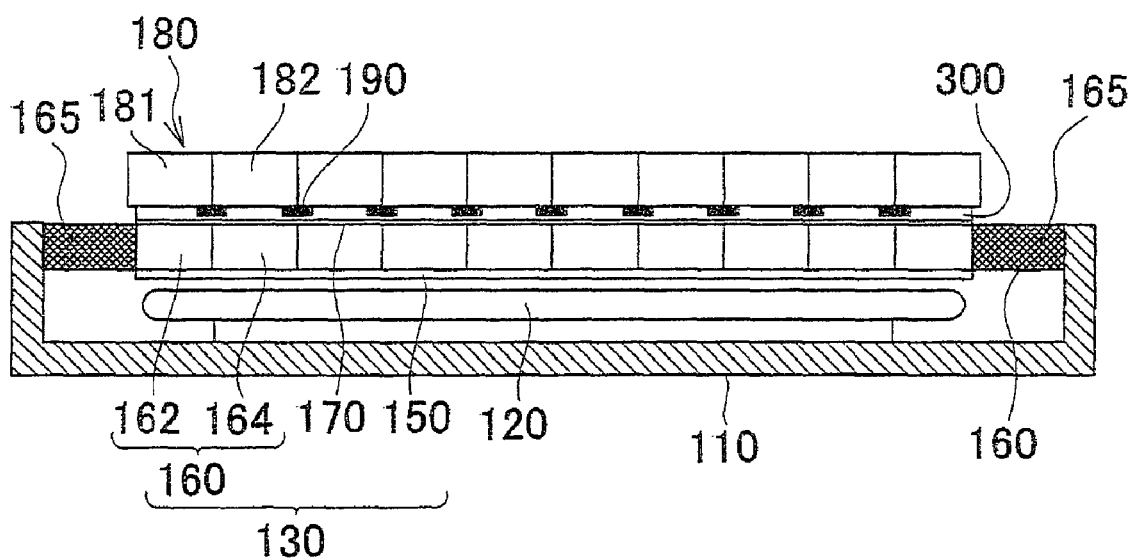
FIG. 3 is a schematic cross sectional diagram showing the stereoscopic image display apparatus 100 stored in a case 110.

FIG. 3 is a schematic diagram showing the stereoscopic image display apparatus 100 stored in a case 110. As shown in FIG. 3, the image display section 130 is supported by the outer frame 165. Furthermore, the retarder 180 and the anti-reflection layer 200 are attached to the emission side of the image display section 130. Here the case 110 stores the light source 120 and the image display section 130. Here, the retarder 180 is attached to the image display section 130 by means of the adhesive layer 300. The thickness of the adhesive layer 300 is desirably the same as the thickness of the light shields 190. Here, "the same thickness" includes the range in which the adhesive layer 300 is approximately 1.5 times thicker than the light shields 190, in addition to complete identicalness in thickness of the adhesive layer 300 and the light shields 190. For example, the thickness of the adhesive layer 300 is desirably 10 µm to 20 µm when the thickness of the light shields 190 is 10 µm to 15 µm. In addition, when the thickness of the light shields 190 is 2 µm to 3 µm, the thickness of the adhesive layer 300 is desirably 2 µm to 5 µm. Here, the thickness of the adhesive layer 300 is the thickness from the incident surface of the right eye polarization regions 181 and the left eye polarization regions 182 of the retarder 180. When the thickness of the light shields 190 is smaller, the air bubbles are prevented from entering in the applying process of applying the adhesive layer 300.

A manufacturing method of the stereoscopic image display apparatus 100 is explained as follows. A manufacturing method of the stereoscopic image display apparatus 100 according to the present embodiment includes an applying process of applying a resin to the image display section 130, a placing process of placing the retarder 180 to the image display section 130, a degassing process of degassing a resin, a laminating process of laminating the image display section 130 and the retarder 180, and an attaching process of attaching the image display section 130 and the retarder 180 by hardening the resin.

Figure 4:
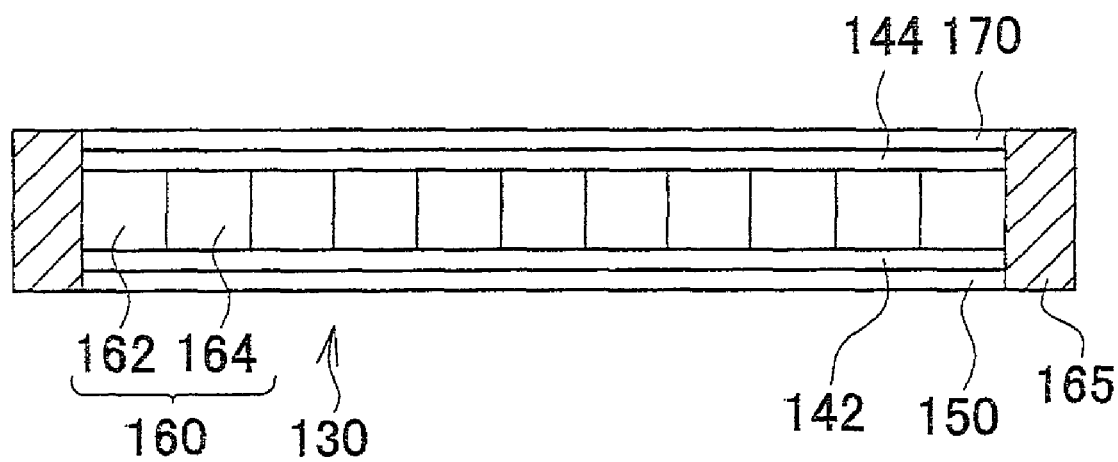
FIG. 4 is a schematic cross sectional diagram showing an image generating section 160 before an applying process.

FIG. 4 is a schematic cross sectional diagram showing an image display section 130 before an applying process. The image generating section 160 in the image display section 130 of FIG. 4 includes a light-source glass substrate 142, an emission-side glass substrate 144, and right eye image generating regions 162 and left eye image generating regions 164 formed by liquid crystal sealed in between the light-source glass substrate 142 and the emission-side glass substrate 144. A light-source polarization plate 150 is provided between the light-source glass substrate 142 and the light source, and an emission-side polarization plate 170 is provided at the emission side of the emission-side glass substrate 144.

Figure 5:
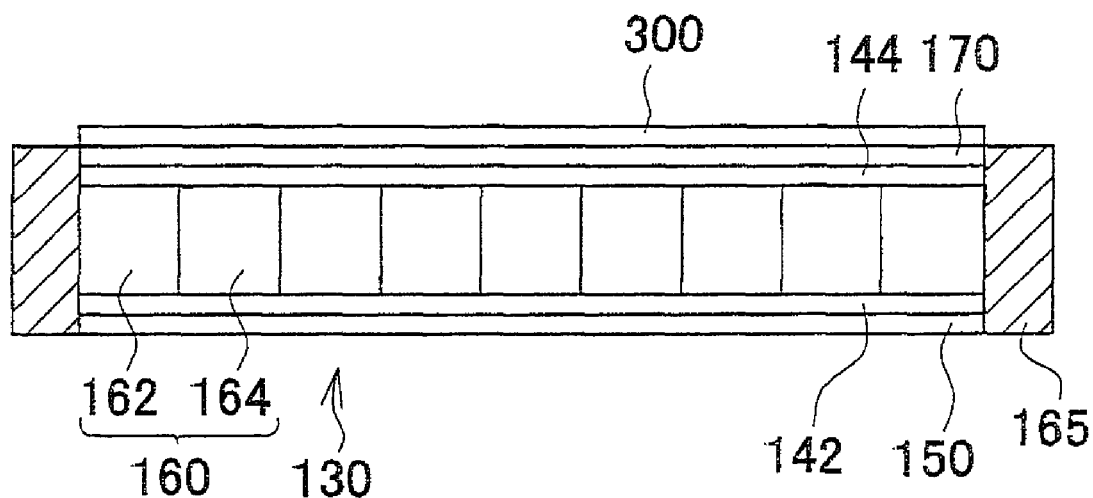
FIG. 5 is a cross sectional diagram for explaining the applying process.

FIG. 5 is a cross sectional diagram for explaining an applying process. In the applying process, a resin is applied to the surface of the emission side of the emission-side polarization plate 170 in the image display section 130, to form the adhesive layer 300. Here, the resin is applied at least to regions where the right eye image generating regions 162 and the left eye image generating regions 164 of the image display section 130 face the right eye polarization regions 181 and the left eye polarization regions 182 of the retarder 180. Instead of this arrangement, it is also possible to apply a resin to the entire surface of the emission-side polarization plate 170. A method of applying a resin is a die coater, a gravure coater, or the like. Furthermore, the image display section 130 may be placed in a vacuum furnace, to apply a resin in the reduced pressure state of the vacuum furnace. Accordingly, it is possible to degas the resin, to improve the transparency and the adhesiveness. Furthermore, the degassing of a resin may be performed after resin application, by application of ultrasonic vibration to the image display section 130. The thickness of the adhesive layer 300 before being hardened in the applying process may be the same as the thickness of a light shield 190 or thinner than a light shield 190. The thickness of the adhesive layer 300 before being hardened in the applying process may be designed appropriately depending on the area of the opening between light shields 190, the thickness of a light shield 190, and the like.

A resin used in the applying process is desirably hardened by heat as well as by ultraviolet light. A resin hardened by heat as well as by ultraviolet light may be a resin having a functional group and an epoxy group whose side chain includes an unsaturated double bond. In addition, a mixture of an ultraviolet light hardening resin and a heat hardening resin may be applied. Examples of an ultraviolet light hardening resin are urethane acrylate, unsaturated polyester acrylate. Examples of a heat hardening resin are unsaturated polyester resin, diallyl phthalate resin, and urethane resin. The viscosity of the above-mentioned resin is desirably 500 cps to 1000 cps at the normal temperatures (25 degrees centigrade). When the viscosity is smaller than 500 cps, the applied resin may flow out. On the contrary when the viscosity is larger than 1000 cps, it becomes hard for the resin to enter between light shields 190 to prevent even coating of a resin.

Figure 6:
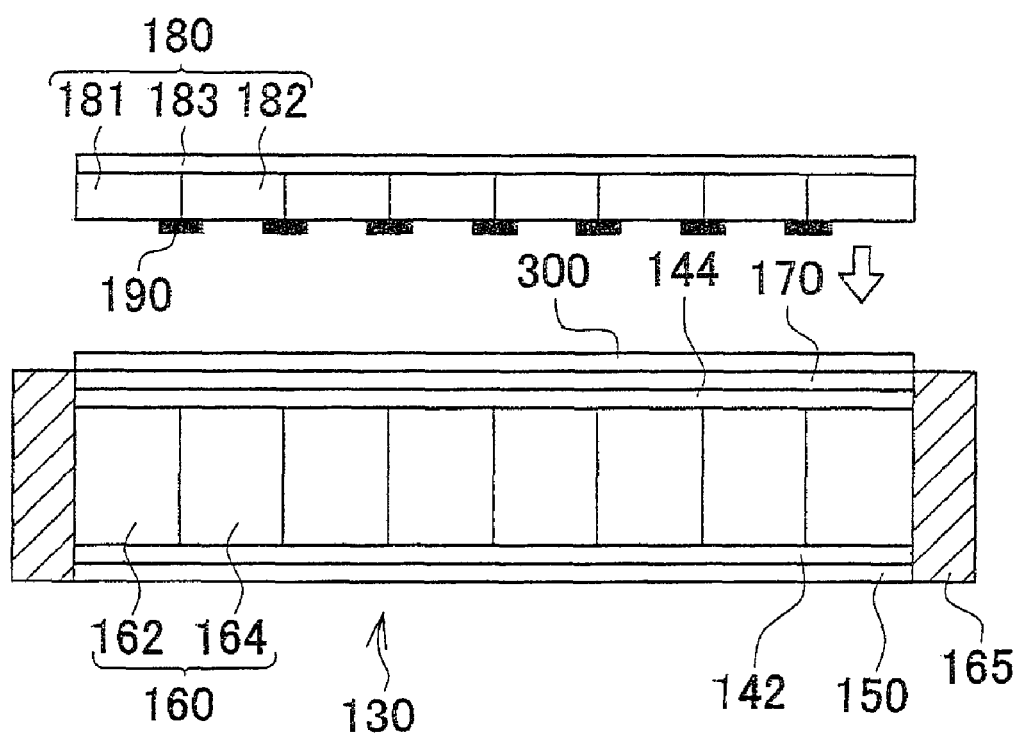
FIG. 6 is a cross sectional diagram for explaining a placing process.

FIG. 6 is a cross sectional diagram for explaining a placing process. In the placing process, the surface of the retarder 180 provided with the light shields 190 is placed over to overlap with the surface of the image display section 130 provided with the adhesive layer 300. Degassing of a resin is performed by placing the image display section 130 and the retarder 180 in the vacuum furnace, in this state in which the retarder 180 is placed over the image display section 130, and by reducing the pressure of the vacuum furnace. In the degassing process, it is also possible to degas the resin by applying ultrasonic vibration to the image display section 130 and the retarder 180.

Note that as shown in FIG. 6, the right eye polarization regions 181 and the left eye polarization regions 182 of the retarder 180 are supported by a glass substrate 183. Since the glass substrate 183 of the retarder 180 is thicker than the emission-side glass substrate 144 of the image display section 130, and an entire surface of the retarder 180 and an entire surface of the image display section 130 are attached to each other, it is possible to maintain the strength and to reduce the thickness of the emission-side glass substrate 144. Accordingly, the distance between the image generating section 160 of the image display section 130, and the right eye polarization regions 181 and the left eye polarization regions 182 of the retarder 180 is shortened, to enlarge the angle of field. For example, when the thickness of the glass substrate 183 is 0.7 mm, the thickness of the emission-side glass substrate 144 can be equal to or smaller than 0.5 mm.

Figure 7:
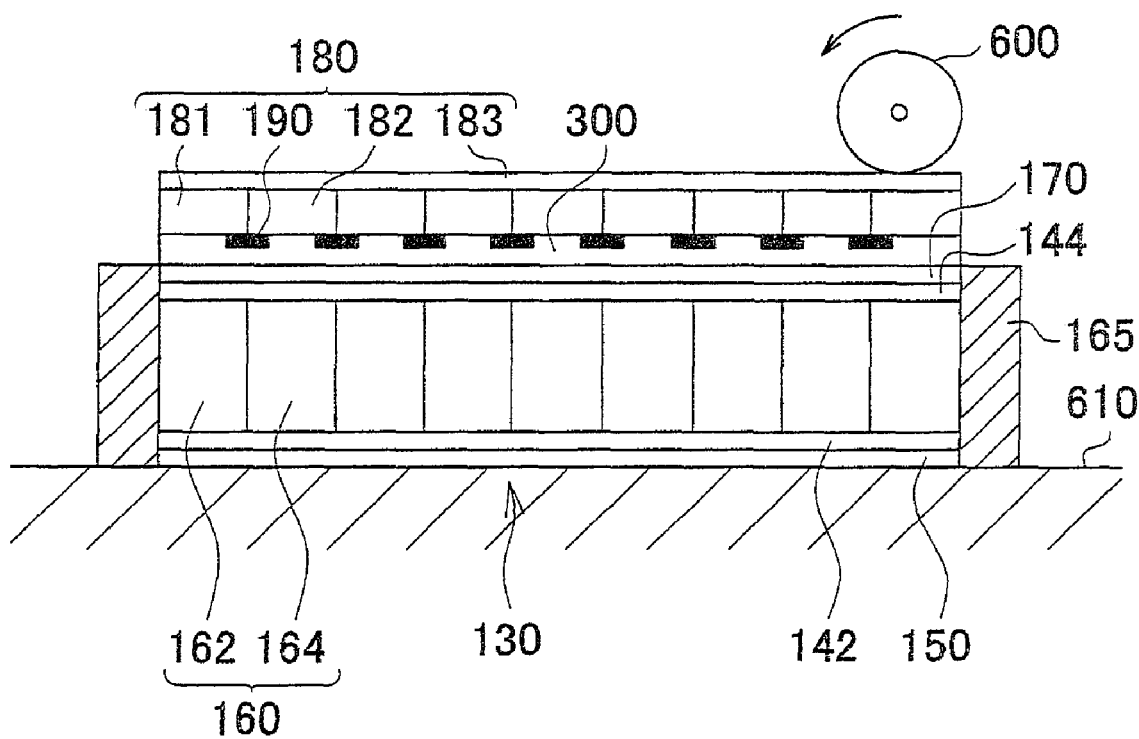
FIG. 7 is a cross sectional diagram for explaining a laminating process.

FIG. 7 is a cross sectional diagram for explaining a laminating process. In the laminating process, the image display section 130 and the retarder 180 after the placing process are placed on the placement board 610, with the retarder 180 facing above. Then by the roller 600 rotating while pressing the glass substrate 183 of the retarder 180, the image display section 130 and the retarder 180 are laminated to each other. According to this method, the thickness of the adhesive layer 300 can be made even to enhance the flatness and the parallelism of the image display section 130 and the retarder 180.

The thickness of the adhesive layer 300 after the laminating process is preferably the same as the thickness of the light shields 190. In the laminating process, the roller may perform lamination by rotating in the alignment direction of the right eye image generating regions 162 and the left eye image generating regions 164 as shown in FIG. 7. The roller may also perform lamination by rotating in the direction orthogonal to FIG. 7, i.e. in the longitudinal direction of the right eye image generating regions 162 and the left eye image generating regions 164. The image display section 130 and the retarder 180 may be aligned after the laminating process. In this case, the alignment may be made easier by mixing, in the adhesive layer 300, a silica-type filler as a spacer. Note that the applying process, the placing process, and the laminating process may be performed in the vacuum furnace under a reduced pressure. Accordingly, it is possible to pursue degassing more effectively, which leads to productivity improvement.

Figure 8:
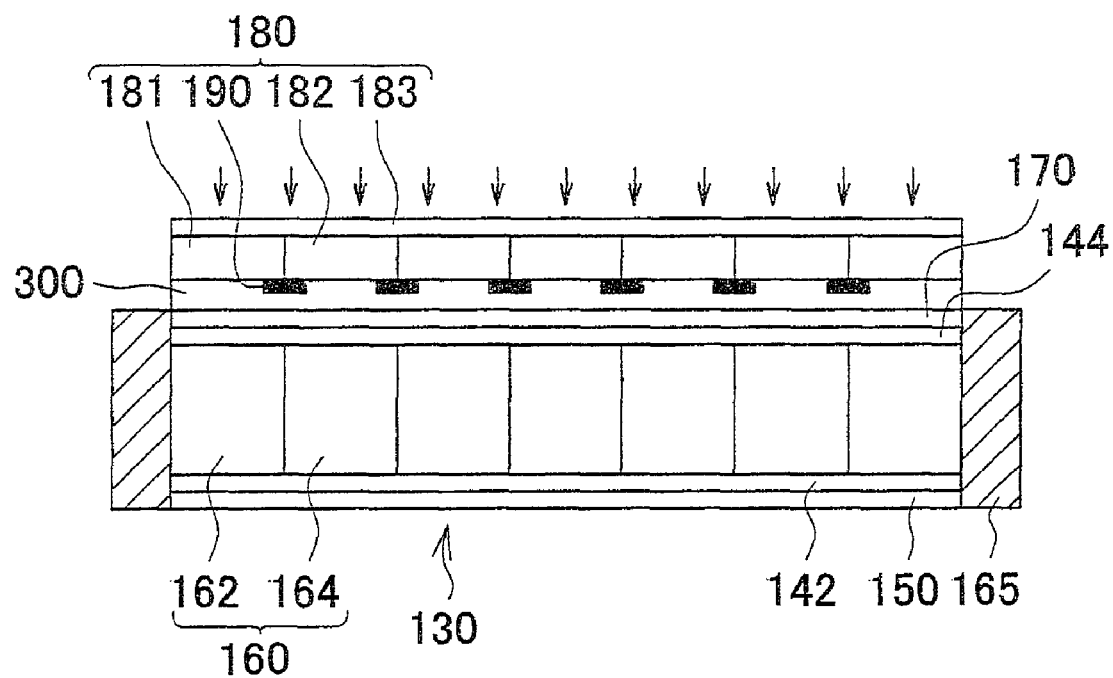
FIG. 8 is a cross sectional diagram for explaining an attaching process.

FIG. 8 is a cross sectional diagram for explaining an attaching process. In the attaching process, ultraviolet light is irradiated from above the retarder 180 to the adhesive layer 300 after the laminating process, to harden the resin of the adhesive layer 300. In this case, ultraviolet light having illuminance of 180 mW/cm$^2$, accumulated light quantity of 3000 mJ/cm$^2$, and wavelength of 365 nm is irradiated, for example. Accordingly, the ultraviolet light is irradiated to the resin of the adhesive layer 300 that is in the regions between the light shields 190 on the retarder 180, to harden the resin in the regions.

In addition, the adhesive layer 300 is heated from outside using a heater or the like, so as to harden the entire adhesive layer 300 by the heat. Accordingly, the resin in the region to which ultraviolet light is not irradiated is also hardened, thereby more assuredly attaching the image display section 130 and the retarder 180. Note that the irradiation of ultraviolet light and heating by means of a heater may be performed synchronously.

The image display section 130 and the retarder 180 attached as described above are attached to the case 110 shown in FIG. 3, thereby completing a stereoscopic image display apparatus 100. According to the present embodiment described above, the image display section 130 and the retarder 180 are attached to each other, by means of resin applied at least to regions where the right eye image generating regions 162 and the left eye image generating regions 164 of the image display section 130 overlap with the right eye polarization regions 181 and the left eye polarization regions 182 of the retarder 180. Accordingly, it is possible to fix the image display section 130 to the retarder 180 tight to each other, thereby enabling to enlarge the angle of field.

Figure 9:
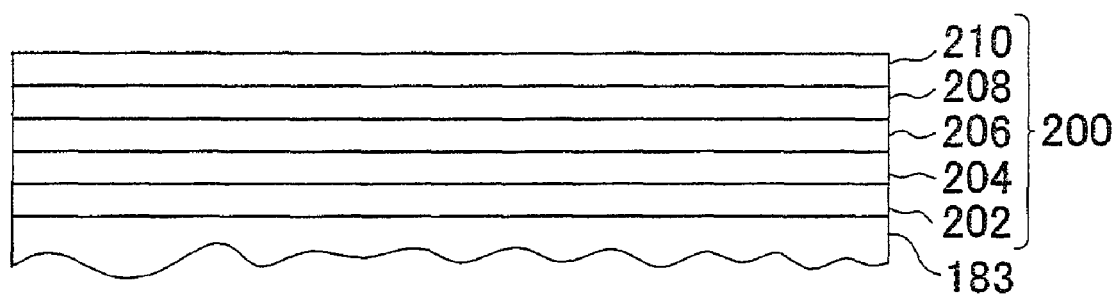
FIG. 9 shows one example of an antireflection layer 200.

FIG. 9 shows one example of an antireflection layer 200. The stereoscopic image display apparatus 100 described above includes an antireflection layer 200 between the retarder 180 and the viewer 500. The antireflection layer 200 includes an adhesive layer 202, a base material 204, a hard coating 206, a high refractive index resin 208, and a low refractive index resin 210, on the glass substrate 183 of the retarder 180, in the stated order. The thickness of the adhesive layer 202 is 25 μm for example. In addition, the base material 204 is for example a tri-acetyl cellulose (TAC), and has a thickness of 80 μm. The thickness of the hard coating 206 is for example 5 μm. The high refractive index resin 208 and the low refractive index resin 210 have refraction indices of 1.65 and 1.40, respectively, and a thickness of 0.1 μm.

Figure 10:
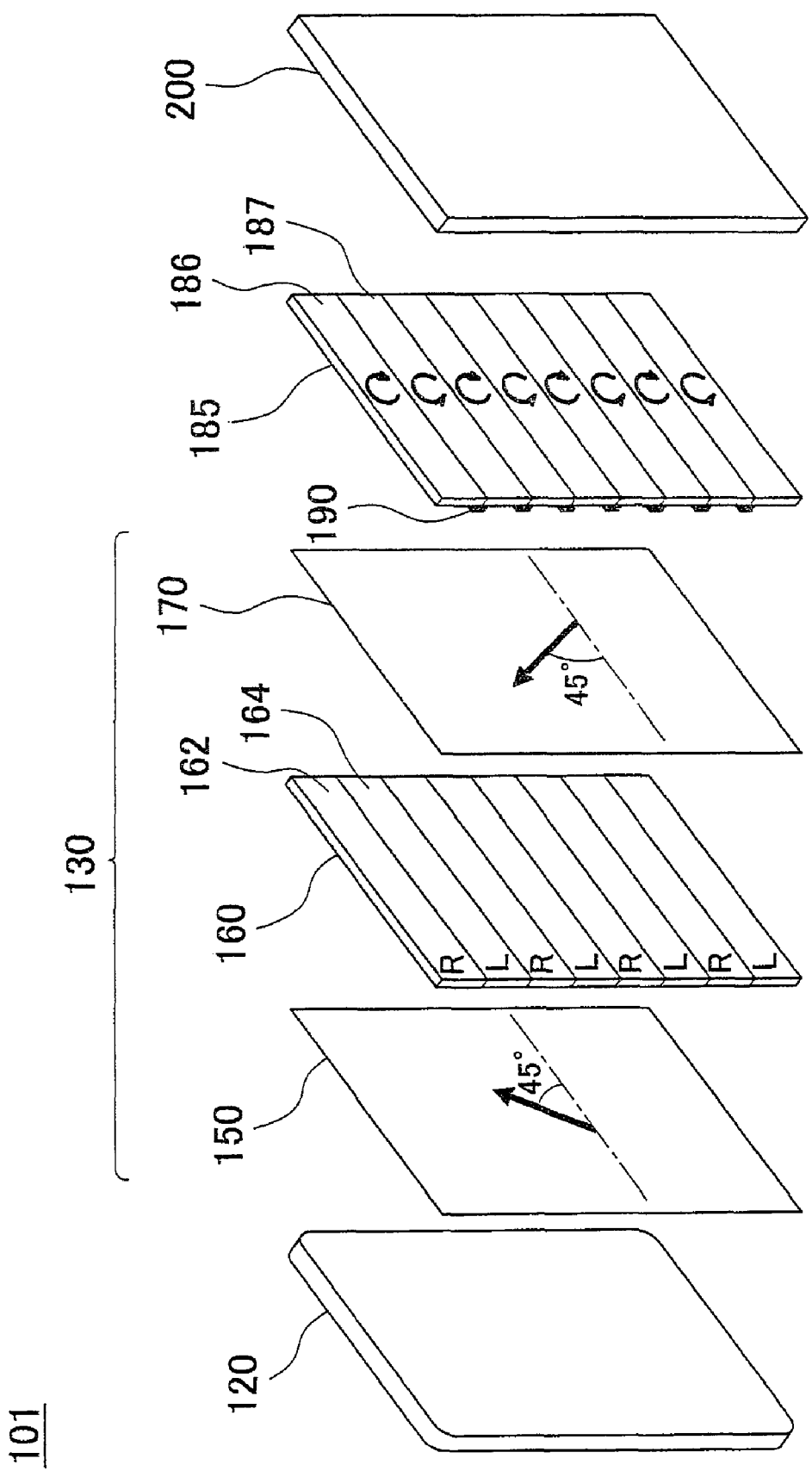
FIG. 10 is an exploded perspective diagram showing another stereoscopic image display apparatus 101 manufactured according to a manufacturing method of the present embodiment.

FIG. 10 is an exploded perspective diagram showing another stereoscopic image display apparatus 101 manufactured according to a manufacturing method of the present embodiment. In the stereoscopic image display apparatus 101 shown in FIG. 10, the configurations same as those of the stereoscopic image display apparatus 100 are assigned the same reference numerals and the description thereof is omitted. As shown in FIG. 10, the stereoscopic image display apparatus 101 includes a retarder 185 instead of the retarder 180 of the stereoscopic image display apparatus 100. This retarder 185 includes right eye polarization regions 186 and left eye polarization regions 187. Here, both of the right eye polarization regions 186 and the left eye polarization regions 187 are ¼ wave retarders, and their optical axes are orthogonal to each other. In this retarder 185, the position and the size of the right eye polarization regions 186 and the left eye polarization regions 187 correspond to the position and the size of the right eye image generating regions 162 and the left eye image generating regions 164 of the image generating section 160 (just as in the case of the position and the size of the right eye polarization regions 181 and the left eye polarization regions 182 of the retarder 180). Accordingly, in the usage state of the stereoscopic image display apparatus 101, right eye image light having been transmitted through the right eye image generating regions 162 is incident to the right eye polarization regions 186, while left eye image light having been transmitted through the left eye image generating regions 164 is incident to the left eye polarization regions 187.

On a surface of the retarder 185 that faces the image display section 130, light shields 190 are provided so that each light shield exists in a boundary between a right eye polarization region 186 and a left eye polarization region 187. A light shield 190 absorbs and cuts off image light attempting to be incident to a right eye polarization region 186 of the retarder 185, from left eye image light that should be incident to a left eye polarization region 187 adjacent to the right eye polarization region 186 of the retarder 185. In addition, the light shield 190 absorbs and cuts off image light attempting to be incident to a left eye polarization region 187 of the retarder 185, from right eye image light that should be incident to a right eye polarization region 186 adjacent to the left eye polarization region 187 of the retarder 185. In this way, by providing the light shields 190 in the boundary regions on the retarder 185, the right eye image light and the left eye image light emitted from the stereoscopic image display apparatus 101 are prevented from causing crosstalk.

The retarder 185 emits incident light as circularly polarized light rays whose polarization axes have rotation directions reverse to each other. For example, the right eye polarization regions 186 emit incident light as circularly polarized light in a clockwise direction, and the left eye polarization regions 187 emit incident light as circularly polarized light in a counterclockwise direction. Note that each arrow for the retarder 185 shown in FIG. 10 shows the rotation direction of polarized light having passed this retarder 185. For example, the right eye polarization regions 186 may be ¼ wave retarders whose optical axis is in the horizontal direction, and the left eye polarization regions 187 may be ¼ wave retarders whose optical axis is in the vertical direction.

Also in the stereoscopic image display apparatus 101 shown in FIG. 10, the adhesive layer 300 is used to attach the image generating section 160 and the retarder 185, just as in the case of the stereoscopic image display apparatus 100. Accordingly, it is possible to fix the image generating section 160 to the retarder 185 tight to each other, thereby enabling to enlarge the angle of field.

In viewing the stereoscopic image display apparatus 101 provided with the retarder 185 shown in FIG. 10, the viewer 500 wears polarized glasses provided with a ¼ wave retarder and a polarized lens respectively in a position corresponding to the right eye 512 and a position corresponding to the left eye 514. In the polarized glasses, the ¼ wave retarder provided for the right eye 512 of the viewer 500 has an optical axis in the horizontal direction, and the ¼ wave retarder provided for the left eye 514 of the viewer 500 has an optical axis in the vertical direction. In addition, the transmission axis direction is 45 degrees in the diagonally right direction from the viewer 500 and the absorption axis direction is orthogonal to the transmission axis direction, for both of the polarized lens provided for the right eye 512 of the viewer 500 and the polarized lens provided for the left eye 514 of the viewer 500.

The viewer 500 views the stereoscopic image display apparatus 101 by wearing the polarized glasses in the following manner. For the right eye 512 of the viewer 500, when circularly polarized light whose polarization axis is in the clockwise direction with respect to the viewer 500 is incident, the circularly polarized light is converted into linearly polarized light that is 45 degrees in the diagonally right direction, by means of the ¼ wave retarder whose optical axis is in the horizontal direction, and is transmitted thorough the polarized lens to be finally viewed by the right eye 512 of the viewer 500. For the left eye 514 of the viewer 500, when circularly polarized light whose polarization axis is in the counterclockwise direction with respect to the viewer 500 is incident, the circularly polarized light is converted into linearly polarized light that is 45 degrees in the diagonally right direction, by means of the ¼ wave retarder whose optical axis is in the vertical direction, and is transmitted thorough the polarized lens to be finally viewed by the left eye 514 of the viewer 500. In this manner, by viewing the stereoscopic image display apparatus 101 by wearing the polarized glasses described above, the right eye 512 is able to view only the right eye image light and the left eye 514 is able to view only the left eye image light. Therefore, the viewer 500 is able to recognize the right eye image light and the left eye image light as a stereoscopic image.

As detailed above, according to the present embodiment, the image display section 130 is attached to the retarder 180 (or 185), by a resin applied at least to regions where the right eye image generating regions 162 and the left eye image generating regions 164 of the image display section 130 overlap with the right eye polarization regions 181 (or 186), and the left eye polarization regions 182 (or 187) of the retarder 180 (or 185). Accordingly, it is possible to fix the image display section 130 to the retarder 180 (or 185) tight to each other, thereby enabling to enlarge the angle of field or to narrow the width of the light shield layer to improve the brightness.

The comparison example 1, the embodiment example 1, and the embodiment example 2 are used to evaluate the above-described embodiments, regarding the enlargement in angle of field and the improvement in brightness.

Comparison Example 1

In the image display section 130 of the comparison example 1, the emission-side glass substrate 144 and the emission-side polarization plate 170 are set to have thicknesses as recited in Table 1 (unit of "mm"). In addition, the pitch of the light shields 190 of the retarder 180 is set as 0.270 mm, and the thickness of the light shields 190 (i.e. the length of the light shields 190 in the normal direction to the surface of the retarder 180) is set as 0.015 mm, and the width of each light shield 190 (i.e. the length of a light shield 190 along the surface of the retarder 180) is set as shown in Table 1. Furthermore, the thickness of the adhesive layer 300 is set as 0.015 mm which is the same as the thickness of the light shields 190. The angle of field is evaluated in this comparison example 1.

Here, "angle of field" represents a range of angles with respect to the normal direction to the retarder 180 or the like, within which crosstalk is not caused between adjacent pixels. In the present embodiment, the angle of field is evaluated in the following manner.

Figure 11:
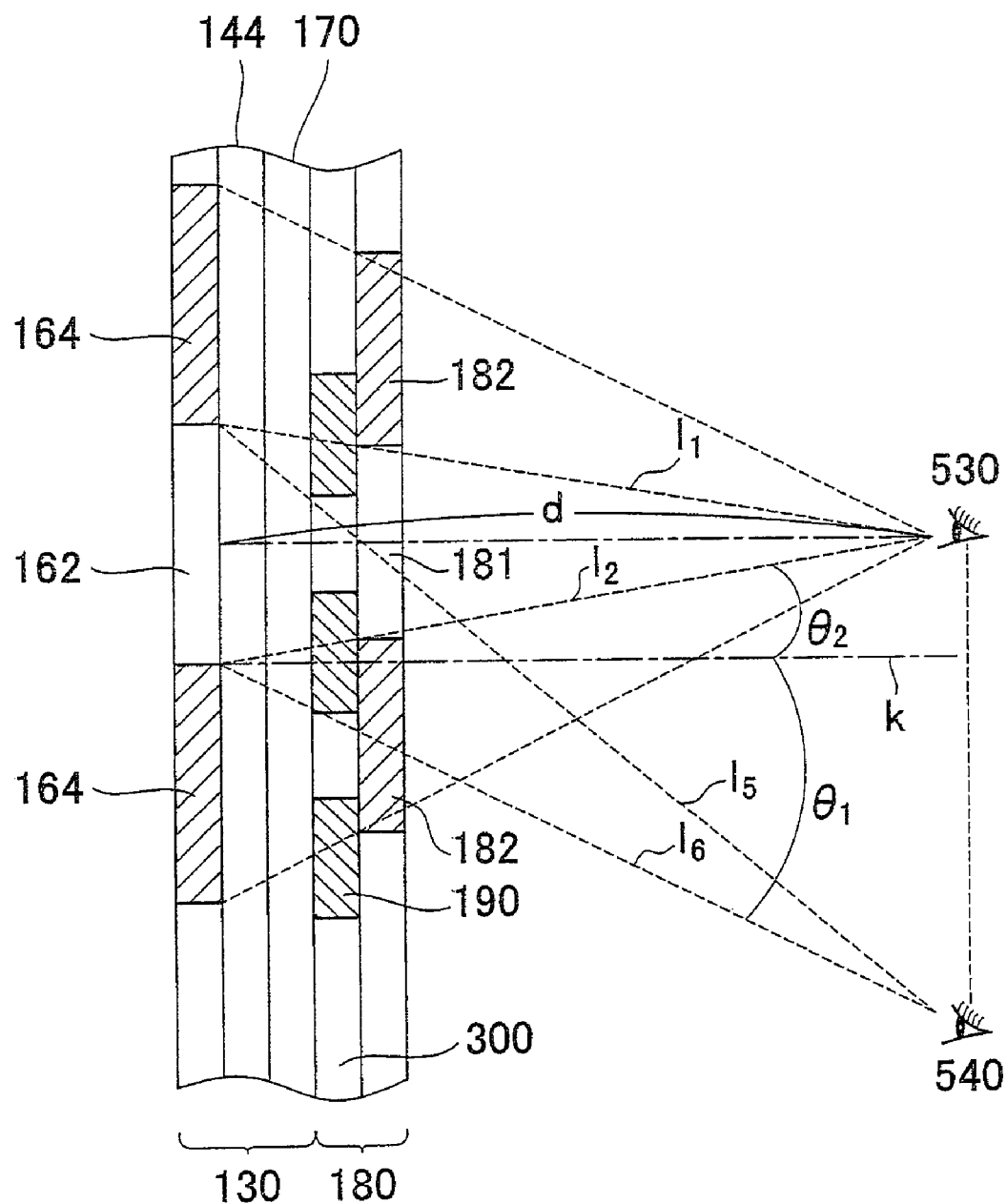
FIG. 11 is a side view of a retarder 180 and an image display section 130, for explaining the angle of field.

FIG. 11 is a side view of a retarder 180 and an image display section 130, for explaining the angle of field. The viewing distance d (i.e. the distance from a viewer 530 to the surface, which faces the light source, of the emission-side glass substrate 144 of the image display section 130) is set as 700 mm. Then the position and the pitch for a right eye polarization region 181 and a left eye polarization region 182 adjacent thereto in the retarder 180 are defined along the straight lines $l_1$ and $l_2$ linking from the viewer 530 to the respective boundaries between a right eye image generating region 162 of the image display section 130 positioned in the same level as the viewer 530 in the horizontal direction and respective left eye image generating regions 164 adjacent to the right eye image generating region 162. Then the angle formed between the straight line $l_6$ and the horizontal line k is referred to as θ1, where the straight line $l_6$ links the boundary between the right eye image generating region 162 and one of the left eye image generating regions 164 adjacent thereto (the left eye image generating region 164 situated lower than the right eye image generating region 162 in FIG. 11), and one end of the light shield 190 that corresponds to the boundary (the lower end of the light shield 190 in FIG. 11). Note that in FIG. 11, the position of the viewer 540 who views the right eye image generating region 162 with the angle of θ1 is also shown. Furthermore, the angle formed between the straight line $l_2$ and the horizontal line k is referred to as θ2, where the straight line $l_2$ links the boundary between the right eye image generating region 162 and the one of the left eye image generating regions 164 adjacent thereto, and the boundary between the corresponding right eye polarization region 181 and the left eye polarization region 182 adjacent thereto. The angle of field is defined as the summation between θ1 and θ2. Then, The aperture ratio is calculated as: (1−(width of each light shield 190)/(pitch of retarder 180))×100. Note that when a left eye image generating region 164 is provided in the same level as the viewer 530 in the horizontal direction, the right eye image generating region 162 and the left eye image generating region 164 may be interchanged, as well as interchanging the right eye polarization region 181 and the left eye polarization region 182, in the above explanation and calculation.

Embodiment Example 1

In the embodiment example 1, the thickness of the emission-side glass substrate 144 of the image display section 130 is set as shown in Table 1, and the other conditions are set as the same as those of the comparison example 1. In other words, the aperture ratio of the embodiment example 1 is set as the same as the aperture ratio of the comparison example 1. In this embodiment example 1, θ1, θ2, and the angle of field are calculated just as in the comparison example 1.

Embodiment Example 2

In the embodiment example 2, the thickness of the emission-side glass substrate 144 of the image display section 130 as well as the width of each light shield 190 of the image display section 130 are set as shown in Table 1, and the other conditions are set as the same as those of the comparison example 1. Here, the width of a light shield 190 is set so that the angle of field of the embodiment example 2 is the same as the angle of field of the comparison example 1. In this embodiment example 2, the aperture ratio is calculated just as in the comparison example 1.

TABLE 1

|  | Comparison Example 1 | Embodiment Example 1 | Embodiment Example 2 |
|---|---|---|---|
| emission-side glass 144 | 0.7 | 0.3 | 0.3 |
| emission-side polarization plate 170 | 0.18 | 0.18 | 0.18 |
| width of a light shield 190 | 0.135 | 0.135 | 0.074 |
| θ1 (degree) | 4.37 | 7.98 | 4.37 |
| θ2 (degree) | 0.01 | 0.02 | 0.01 |
| angle of field (degree) | 4.38 | 8.00 | 4.38 |
| aperture ratio (%) | 49.9 | 49.9 | 72.7 |

As is clear from the above Table 1, in the embodiment example 1, the angle of field is about 1.8 times (calculated as "8.01 divided by 4.39") the angle of field of the comparison example 1. Moreover, the aperture ratio of the embodiment example 2 is about 1.5 times (calculated as "72.7 divided by 49.9") the aperture ratio of the comparison example 1. In other words, the brightness of the embodiment example 2 is about 1.5 times the brightness of the comparison example 1.

As described so far, according to the present embodiment, the image display section 130 is attached to the retarder 180 (or 185), by means of a resin applied at least to regions where the right eye image generating regions 162 and the left eye image generating regions 164 of the image display section 130 overlap with the right eye polarization regions 181 (or 186), and the left eye polarization regions 182 (or 187) of the retarder 180 (or 185). Accordingly, it is possible to fix the image display section 130 to the retarder 180 (or 185) tight to each other, thereby enabling to enlarge the angle of field. Furthermore, compared to a case where an air layer exists between the image display section 130 and the retarder 180 (or 185), the internal reflection is able to be restrained between the image display section 130 and the retarder 180 (or 185), thereby reducing crosstalk. In particular, even when a large-sized image display section 130 bends, the adhesive layer 300 and the retarder 180 (or 185) can follow the bending, and so moire can be prevented from occurring between the image display section 130 and the retarder 180 (or 185). In addition, because the resin is hardened after the laminating process, it is possible to cause the adhesive layer 300 to have an even thickness and to enhance the flatness and the parallelism of the image display section 130 and the retarder 180 (or 185). Furthermore, by reducing the distance between the image display section 130 and the retarder 180 (or 185), the width of each light shield 190 can be narrowed, while maintaining the angle of field to the same level as before narrowing the distance. Accordingly, it is possible to enlarge the aperture portion between light shields 190 to improve the screen brightness.

Figure 12:
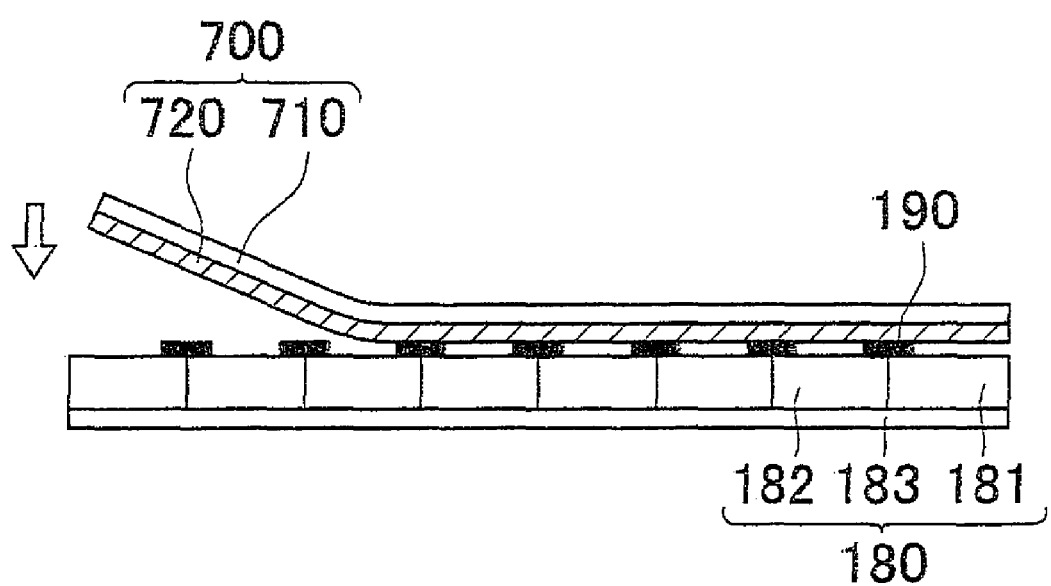
FIG. 12 is a cross sectional diagram for explaining an attaching process in another manufacturing method of the present embodiment.

FIG. 12 is a cross sectional diagram for explaining an attaching process in another manufacturing method of the present embodiment. The present manufacturing method includes an attaching process instead of an applying process of the manufacturing method shown in FIGS. 1-11. The present manufacturing method further includes a heating process. In the present manufacturing method, the configurations and operations that are the same as those of the manufacturing method of FIGS. 1-11 are assigned the same reference numerals, and the description thereof is omitted.

As shown in FIG. 12, the attaching process includes a process of attaching an adhesive sheet 700 to a surface of the retarder 180 at the incident side. Here, the adhesive sheet 700 includes a resin layer 720 and a separate film 710 supporting the resin layer 720. The resin layer 720 is a resin of an ultraviolet light hardening type, and an example thereof is an urethane acrylate resin such as ThreeBond (registered trademark) 1630 by ThreeBond (registered trademark) Co., Ltd. In the example shown in FIG. 12, an adhesive sheet 700 is attached to the retarder 180 by placing the resin layer 720 side of the adhesive sheet 700 to the surface of the retarder 180 to which the light shields 190 are provided. Note that the adhesive sheet 700 may be obtained by cutting a roll into each necessary adhesive sheet, or may be formed in a single sheet form in advance. Here, the thickness of the resin layer for the adhesive sheet 700 is preferably 15-75 μm when the thickness of the light shields 190 is 3-10 μm. Accordingly, the resin is uniformly provided even to the concave portions between the light shields 190, to make the surface smooth.

Figure 13:
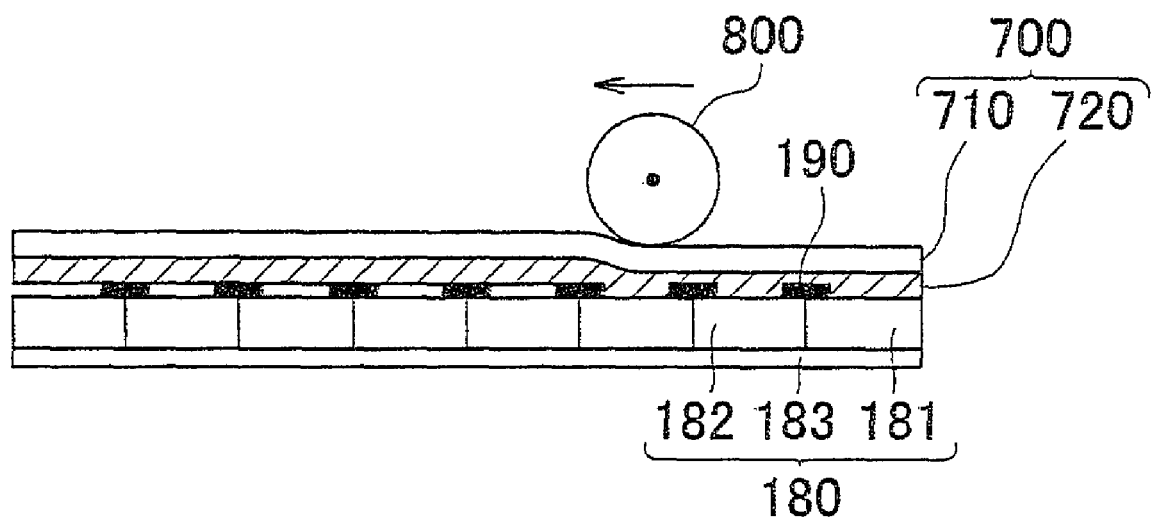
FIG. 13 is a cross sectional diagram for explaining the attaching process, which is a continuation from FIG. 12.

FIG. 13 is a cross sectional diagram for explaining the attaching process, which is a continuation from FIG. 12. As shown in FIG. 13, the attaching process further includes a process of laminating the adhesive sheet 700 to the retarder 180 by pressing a heated roller 800 against the separate film 710 side of the adhesive sheet 700 attached to the surface of the retarder 180 at the incident side. In the process shown in FIG. 13, lamination is performed by movement of the heated roller 800 while rotating at a speed of 0.3 m/min in the direction of the arrow in the drawing on the resin layer 720 of the adhesive sheet 700, in the chamber of the atmospheric temperature of 80 degrees centigrade and at the atmospheric pressure (0.1 MPa), to preliminarily attach the adhesive sheet 700 to the retarder 180. By performing lamination using a heated roller 800, the resin layer 720 is able to correspond to the concave/convex form due to the light shields 190, thereby enabling provision of the resin layer 720 throughout the entire surface of the retarder 180 at the incident side.

Figure 14:
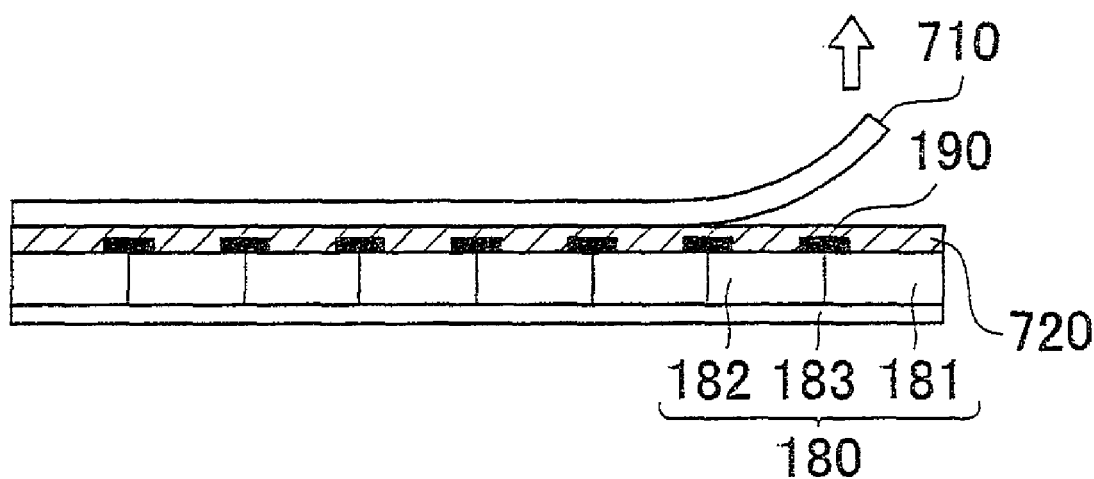
FIG. 14 is a cross sectional diagram for explaining the attaching process, which is a continuation from FIG. 13.

FIG. 14 is for explaining the attaching process, which is a continuation from FIG. 13. As shown in FIG. 14, the attaching process further includes a process of peeling off the laminated separate film 710 of the adhesive sheet 700, from the resin layer 720. As a result, the resin layer 720 remains on the retarder 180 in the exposed state.

Figure 15:
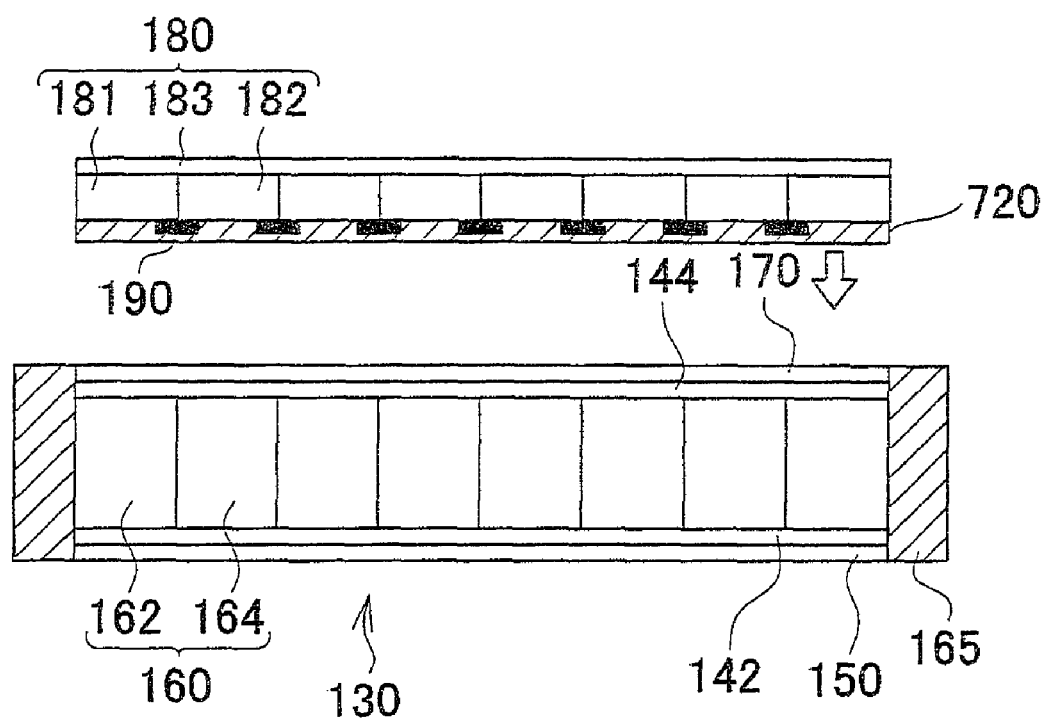
FIG. 15 is a cross sectional diagram for explaining a placing process for placing a retarder 180 to an image display section 130.

FIG. 15 is a cross sectional diagram for explaining a placing process for placing a retarder 180 on an image display section 130, in the laminating process next to the attaching process. As shown in FIG. 15, the exposed resin layer 720 produced in the process of FIG. 14 is superposed to face the emission-side polarization plate 170 of the image display section 130. Here, the positional alignment between the retarder 180 and the image display section 130 is determined. In determining the positional alignment, the retarder 180 is occasionally peeled off from the image display section 130 and superposed thereto a plural number of times. However, since the resin layer 720 is laminated to the retarder 180, the resin layer 720 assuredly remains on the retarder 180 side even after peeling off the retarder 180 from the image display section 130, which facilitates easy peeling of the retarder 180 from the image display section 130.

After determining the positional alignment, the image display section 130 is vacuum pressure laminated to the retarder 180. In the vacuum pressure lamination, the image display section 130 and the retarder 180, overlapped to each other, are placed in the vacuum furnace having an atmospheric temperature of 80 degrees centigrade and a pressure of 150 Pa. Furthermore, a member in a balloon shape is used to supply a pressure of 0.1 MPa to one of the image display section 130 and the retarder 180, and the condition is maintained for 3 minutes. Accordingly, the image display section 130 is pressed to be attached to the retarder 180, and air bubbles of the resin layer 720 are removed.

A heating process is also included after the laminating process. In this heating process, the image display section 130 and the retarder 180 are heated in the atmosphere having a pressure higher than the atmospheric pressure. The pressure in the atmosphere in the heating process is preferably higher than the lamination pressure in the laminating process. One example of the condition used in the heating process is that the image display section 130 and the retarder 180 are placed in a chamber having an atmospheric temperature of 60 degrees centigrade and a pressure of 0.6 MPa for one hour. As a result of the heating process, deformation caused to the image display section 130 and the retarder 180 as a result of the vacuum pressure lamination is released. Furthermore, the heating process enables to break or push out the air bubbles of the resin layer 720 remaining without being removed even after the vacuum pressure lamination. After the heating process, ultraviolet light is irradiated to attach the image display section 130 to the retarder 180, just as in the attaching process of FIG. 8.

As described so far, the embodiment shown in FIGS. 12-15 achieves the following effects, in addition to the effects of the embodiment shown in FIGS. 1-11. The present embodiment uses an adhesive sheet 700 for attaching the image display section 130 and the retarder 180, which makes it easier to peel off the retarder 180 from the image display section 130 if before the hardening of the resin layer 720 of the adhesive sheet 700. Accordingly, the positional alignment between the image display section 130 and the retarder 180 becomes easier. In this case, since the resin layer 720 is laminated to the retarder 180 side using the heated roller 800 or the like, the resin layer 720 will more assuredly remain on the retarder 180 side when peeling off the retarder 180 from the image display section 130, which facilitates easy peeling off. In addition, by laminating the resin layer 720 to the retarder 180 first, the resin layer 720 is able to correspond to the concave/convex form due to the light shields 190, thereby enabling provision of the resin layer 720 assuredly between the retarder 180 and the image display section 130.

In addition, a pressing process is included between the laminating process and the attaching process, and so deformation caused to the image display section 130 and the retarder 180 in the laminating process is released. Furthermore, the heating process enables to break and push out air bubbles remaining in the resin layer 720 without being removed even after the laminating process.

Note that the adhesive sheet 700 is attached to the retarder 180 first before performing lamination, in the embodiment shown in FIGS. 12-15. However, the adhesive sheet 700 may be laminated to the image display section 130 first before performing lamination.

Although some aspects related to the innovations herein have been described by way of exemplary embodiments, it should be understood that those skilled in the art might make many changes and substitutions without departing from the spirit and the scope of the present invention which is defined only by the appended claims.

What is claimed is:

1. A manufacturing method used for a stereoscopic image display apparatus that includes an image display section and a retarder, the image display section including an image generating section that includes a right eye image generating region for generating right eye image light and a left eye image generating region for generating left eye image light, the image display section emitting the right eye image light and the left eye image light as linearly polarized light rays whose polarization axes are parallel to each other, the retarder provided at the emission side of the image display section and including a right eye polarization region, a left eye polarization region, and a light shield that is provided on an incident-side surface of the retarder in a boundary between the right eye polarization region and the left eye polarization region and that shields the incident right eye image light and the incident left eye image light, the retarder, when the right eye image light is incident to the right eye polarization region and the left eye image light is incident to the left eye polarization region, emitting the incident right eye image light and the incident left eye image light as linearly polarized light rays whose polarization axes are orthogonal to each other or circularly polarized light rays that have polarization axes whose rotation directions are reverse to each other, the manufacturing method comprising:

applying a resin to a region where the right eye image generating region and the left eye image generating region of the image display section overlap with the right eye polarization region and the left eye polarization region of the retarder, on at least one of an emission-side surface of the image display section and the incident-side surface of the retarder;

after the applying, laminating the image display section and the retarder so that the emission-side surface of the image display section faces the incident-side surface of the retarder;

attaching the image display section and the retarder by hardening the resin between the image display section and the retarder laminated to each other in the laminating; and between the applying and the laminating, degassing the resin in a vacuum furnace.

2. The manufacturing method as set forth in claim 1, wherein
the degassing includes degassing the image display section to which the resin is applied, by means of an ultrasonic wave.

3. The manufacturing method as set forth in claim 1, wherein
the resin is degassed by performing the applying and the laminating under a vacuum furnace under a reduced pressure.

4. The manufacturing method as set forth in claim 1, wherein
the applying includes applying the resin that includes an ultraviolet light hardening resin, and
the attaching includes irradiating ultraviolet light to the resin.

5. The manufacturing method as set forth in claim 4, wherein
the applying includes applying the resin that includes a heat hardening resin, and the attaching includes heating the resin.

6. The manufacturing method as set forth in claim 1, wherein
the applying includes applying a resin that is hardened by ultraviolet light and by heat, and
in the attaching, the resin positioned adjacent to the light shield is hardened by ultraviolet light irradiated from the side of the retarder, and thereafter the entirety of the resin is hardened by being heated.

7. The manufacturing method as set forth in claim 1, wherein
the applying includes applying a resin that is hardened by ultraviolet light and by heat, and
in the attaching, the entirety of the resin is hardened by heating the resin while irradiating ultraviolet light to the resin from the side of the retarder.

8. The manufacturing method as set forth in claim 1, further comprising:
after the applying, placing the image display section and the retarder so that the emission-side surface of the image display section faces the incident-side surface of the retarder; and
during or after the degassing, pressing the image display section and the retarder together,
wherein the degassing is performed after the placing.

9. The manufacturing method as set forth in claim 1, further comprising:
after the first attaching, placing the image display section and the retarder so that the emission-side surface of the image display section faces the incident-side surface of the retarder; and
during or after the degassing, pressing the image display section and the retarder together,
wherein the degassing is performed after the placing.

10. A manufacturing method used for a stereoscopic image display apparatus that includes an image display section and a retarder, the image display section including an image generating section that includes a right eye image generating region for generating right eye image light and a left eye image generating region for generating left eye image light, the image display section emitting the right eye image light and the left eye image light as linearly polarized light rays whose polarization axes are parallel to each other, the retarder provided at the emission side of the image display section and including a right eye polarization region, a left eye polarization region and a light shield that is provided on an incident-side surface of the retarder in a boundary between the right eye polarization region and the left eye polarization region and that shields the incident right eye image light and the incident left eye image light, the retarder, when the right eye image light is incident to the right eye polarization region and the left eye image light is incident to the left eye polarization region, emitting the incident right eye image light and the incident left eye image light as linearly polarized light rays whose polarization axes are orthogonal to each other or circularly polarized light rays that have polarization axes whose rotation directions are reverse to each other, the manufacturing method comprising:
first attaching an adhesive sheet including a hardening resin to a region where the right eye image generating region and the left eye image generating region of the image display section overlap with the right eye polarization region and the left eye polarization region of the retarder, on at least one of an emission-side surface of the image display section and the incident-side surface of the retarder;
after the first attaching, laminating the image display section and the retarder so that the emission-side surface of the image display section faces the incident-side surface of the retarder; and
second attaching the image display section and the retarder by hardening the resin between the image display section and the retarder laminated to each other in the laminating, wherein
the first attaching includes:
attaching a resin layer of the adhesive sheet to the incident-side surface of the retarder, the adhesive sheet including the resin layer and a separate film supporting the resin layer;
laminating the adhesive sheet to the retarder by pressing a heated roller against the separate film of the adhesive sheet having been attached to the incident-side surface of the retarder; and
peeling off the separate film of the laminated adhesive sheet from the resin layer.

11. The manufacturing method as set forth in claim 10, further comprising:
between the laminating and the second attaching, heating the image display section and the retarder in an atmosphere whose pressure is higher than an atmospheric pressure.

12. The manufacturing method as set forth in claim 11, wherein
the pressure of the atmosphere in the heating is higher than a laminating pressure in the laminating.

13. A manufacturing method used for a stereoscopic image display apparatus that includes an image display section and a retarder, the image display section including an image generating section that includes a right eye image generating region for generating right eye image light and a left eye image generating region for generating left eye image light, the image display section emitting the right eye image light and the left eye image light as linearly polarized light rays whose polarization axes are parallel to each other, the retarder provided at the emission side of the image display section and including a right eye polarization region, a left eye polarization region, and a light shield that is provided on an incident-side surface of the retarder in a boundary between the right eye polarization region and the left eye polarization region and that shields the incident right eye image light and the incident left eye image light, the retarder, when the right eye image light is incident to the right eye polarization region and the left eye image light is incident to the left eye polarization region, emitting the incident right eye image light and the incident left eye image light as linearly polarized light rays whose polarization axes are orthogonal to each other or circularly polarized light rays that have polarization axes whose rotation directions are reverse to each other, the manufacturing method comprising:
first attaching an adhesive sheet including a hardening resin to a region where the right eye image generating region and the left eye image generating region of the image display section overlap with the right eye polarization region and the left eye polarization region of the retarder, on at least one of an emission-side surface of the image display section and the incident-side surface of the retarder;
after the first attaching, laminating the image display section and the retarder so that the emission-side surface of the image display section faces the incident-side surface of the retarder;
second attaching the image display section and the retarder by hardening the resin between the image display section and the retarder laminated to each other in the laminating; and
between the first attaching and the laminating, degassing the resin in a vacuum furnace.

14. The manufacturing method as set forth in claim 13, wherein
the first attaching includes:
attaching a resin layer of the adhesive sheet to the incident-side surface of the retarder, the adhesive sheet including the resin layer and a separate film supporting the resin layer;
laminating the adhesive sheet to the retarder by pressing a heated roller against the separate film of the adhesive sheet having been attached to the incident-side surface of the retarder; and
peeling off the separate film of the laminated adhesive sheet from the resin layer.

15. The manufacturing method as set forth in claim 14, further comprising:
between the laminating and the second attaching, heating the image display section and the retarder in an atmosphere whose pressure is higher than an atmospheric pressure.

16. The manufacturing method as set forth in claim 15, wherein
the pressure of the atmosphere in the heating is higher than a laminating pressure in the laminating.

17. A stereoscopic image display apparatus manufactured in a method that includes an image display section and a retarder, the image display section including an image generating section that includes a right eye image generating region for generating right eye image light and a left eye image generating region for generating left eye image light, the image display section emitting the right eye image light and the left eye image light as linearly polarized light rays whose polarization axes are parallel to each other, the retarder provided at the emission side of the image display section and including a right eye polarization region, a left eye polarization region, and a light shield that is provided on an incident-side surface of the retarder in a boundary between the right eye polarization region and the left eye polarization region and that shields the incident right eye image light and the incident left eye image light, the retarder, when the right eye image light is incident to the right eye polarization region and the left eye image light is incident to the left eye polarization region, emitting the incident right eye image light and the incident left eye image light as linearly polarized light rays whose polarization axes are orthogonal to each other or circularly polarized light rays that have polarization axes whose rotation directions are reverse to each other, the manufacturing method comprising:
applying a resin to a region where the right eye image generating region and the left eye image generating region of the image display section overlap with the right eye polarization region and the left eye polarization region of the retarder, on at least one of an emission-side surface of the image display section and the incident-side surface of the retarder;
after the applying, laminating the image display section and the retarder so that the emission-side surface of the image display section faces the incident-side surface of the retarder;
attaching the image display section and the retarder by hardening the resin between the image display section and the retarder laminated to each other in the laminating; and
between the applying and the laminating, degassing the resin in a vacuum furnace.

18. The stereoscopic image display apparatus as set forth in claim 17, wherein
the image display section includes a pair of glass substrates and liquid crystal sealed in between the pair of glass substrates, and
a thickness of the glass substrate at the emission side is less than or equal to 0.5 mm.

19. The stereoscopic image display apparatus as set forth in claim 17, wherein
the image display section includes a pair of glass substrates and liquid crystal sealed in between the pair of glass substrates,
the retarder includes a glass substrate for supporting the right eye polarization region and the left eye polarization region, and
a thickness of the glass substrate of the retarder is larger than the thickness of the glass substrate at the emission side of the image display section.

* * * * *